United States Patent

[11] 3,607,834

[72] Inventors: Matthias Marx, Bad Duerkheim; Hermann Pankraz Hofmann, Frankenthal, Upper Palatinate; Hans Klug, Lampertheim, all of Germany
[21] Appl. No.: 740,104
[22] Filed: June 26, 1968
[45] Patented: Sept. 21, 1971
[73] Assignee: Badische Anilin-& Soda-Fabrik Aktiengesellschaft Ludwigshafen am Rhine, Germany
[32] Priority: June 28, 1967
[33] Germany
[31] P 16 44 988.0

[54] COATING AND BONDING AGENTS OF ACETOACETATES OF POLYVALENT METALS, DILUENTS AND COPOLYMERS OF ACETOACETIC ACID ESTERS
4 Claims, No Drawings

[52] U.S. Cl. .................................................. 260/63R, 117/124 E, 117/132 C, 117/138.8 UA, 117/148, 117/161 UZ, 117/161 UT, 260/29.6 RW, 260/29.6 TA, 260/312 R, 260/31.2 N, 260/32.8 R, 260/32.8 N, 260/33.2 R, 260/33.4 R, 260/33.6 UA, 260/63 N, 260/80.5, 260/85.5 ES, 260/85.5 XA, 260/86.1 R, 260/86.1 N, 260/86.3, 260/836, 260/844, 260/853, 260/873, 260/876 R

[51] Int. Cl. .................................................. C08f 11/00, C08s 15/00, C08g 25/00
[50] Field of Search .................................................. 260/63, 63 N, 65

[56] References Cited
UNITED STATES PATENTS

| | | | |
|---|---|---|---|
| 2,659,711 | 11/1953 | Wilkins | 260/63 |
| 3,053,804 | 9/1962 | Caldwell et al. | 260/47 |
| 3,349,019 | 10/1967 | Podall | 204/159.11 |

*Primary Examiner*—William H. Short
*Assistant Examiner*—L. L. Lee
*Attorney*—Johnson, Root, O'Keefe, Keil, Thompson & Shurtleff

ABSTRACT: Coating and bonding agents based on mixtures of acetoacetates of polyvalent metals, diluents, copolymers of polymerizable acetoacetic esters having the general formula $$CH_3-\underset{\underset{O}{\|}}{C}-CH_2-\underset{\underset{O}{\|}}{C}-O-Y-O-\underset{\underset{O}{\|}}{C}-\underset{\underset{R}{|}}{C}=CH_2$$

where Y is a hydrocarbon radical and R is H or $CH_3$, and acrylic and/or methacrylic esters and/or styrene given hard and clear films which are resistant to weathering and may chemicals.

COATING AND BONDING AGENTS OF ACETOACETATES OF POLYVALENT METALS, DILUENTS AND COPOLYMERS OF ACETOACETIC ACID ESTERS

This invention relates to coating and bonding agents based on copolymers containing acetoacetate groups.

Surface coating based on mixtures of polymers having chelate-forming groups, metal chelate compounds and diluents are known from UK Pat. Specs. Nos. 791,325 and 807,198. Copolymers of acryloacetone or vinyl salicylate with other ethylenically unsaturated compounds are used as polymers capable of forming metal chelates. Examples of metal chelate compounds used for the prior art coating agents are acetylacetonates of aluminum, magnesium and zinc. A reaction including cross-linking of the polymer takes place between the acetylacetonates and the copolymers having chelate-forming groups during the formation of a film from the solutions or during heating of the film. Films which are not resistant to chelate-forming solvents such as acetylacetone or ethyl acetoacetate are obtained however by the said prior art methods. Moreover aqueous solutions of the polymerized chelate-forming binders cannot be used in the said prior art methods because known chelatizing polymers are suddenly separated as insoluble precipitates when their solutions are being concentrated.

We have now found that coating and bonding agents based on mixtures of (i) polymers of ethylenically unsaturated compounds having acetylacetate groups, (ii) acetoacetates of polyvalent metals, (iii) diluents and if desired (iv) one or more additives do not have the said disadvantages when they contain, as the polymers having acetylacetate groups, copolymers of (a) 10 to 95 percent of their weight of polymerized acetoacetic esters having the general formula:

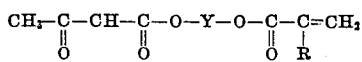

in which Y denotes a hydrocarbon radical having two to ten carbon atoms and R denotes a hydrogen atom or a methyl group, (b) 5 to 90 percent of their weight of acrylic and/or methacrylic esters of alkanols having one to twenty carbon atoms and/or styrene and (c) 0 to 30 percent of their weight of one or more ethylenically unsaturated monomers.

The acetylacetonates of aluminum, zinc, nickel and beryllium, or mixtures of such acetylacetonates, are of special interest as acetylacetonates of polyvalent metals. Examples of other acetylacetonates are those of magnesium, zirconium, titanium, cobalt, copper and zinc. These acetylacetonates are known and can be obtained by conventional methods. The acetylacetonates are preferably used in the form of their solutions for the coating and bonding agents. They may also be stirred for example in solid form into the solutions of the copolymers.

Examples of suitable solvents for the coating and bonding agents according to the invention are aromatic hydrocarbons such as benzene, toluene and xylene, ketones such as methyl ethyl ketone, esters of saturated carboxylic acids such as ethyl acetate, butyl acetate and methyl glycol acetate, essential oils such as spirits of turpentine and pine oil, alcohols such as methanol, ethanol, isopropanol, n-butanol, isobutanol and glycol and also glycol ethers, for example the methyl ether of glycol. In some cases small amounts of volatile solvents, particularly acetone or tetrahydrofuran, are advantageous. Water is also very suitable as well as mixtures thereof with water-miscible solvents. These solvent mixtures and water are particularly suitable when the polymers used for the coating and bonding agents have strongly polar groups, for example carboxylate, ammonium or hydroxy groups.

The polymers having acetylacetate groups contain 10 to 95 percent, preferably 25 to 70 percent, of their weight of polymerized units of polymerizable acetoacetic esters of the above-mentioned general formula. These acetoacetic esters may be derived for example from glycol, propanediol-1,2, butanediol-1,4, hexanediol-1,6, octanediol-1,8 or cyclohexanediol-1,4, 2,2-dimethylpropandiol-1,3 and 1,4-dimethylolcyclohexane; in each case one hydroxyl group of these diols is esterfied with acrylic or methacrylic acid and the other with acetoacetic acid. These diesters may be prepared for example by first reacting diols of the said type with acrylic acid or methacrylic acid to form the hemiester and then converting the free hydroxyl groups into acetoacetic ester groups with diketene. These reactions can be carried out by conventional methods. The acetylacetates of glycol monoacrylates, glycol monomethacrylate, butanediol-1,4-monoacrylate and propanediol-1,2-monoacrylate are examples of particularly suitable acetoacetic acid esters.

The copolymers should also contain 5 to 90 percent of polymerized units of styrene and/or acrylic or methacrylic esters of alkanols containing one to twenty carbon atoms. Acrylic and methacrylic esters of ethanol, n-propanol, isopropanol, n-butanol, tert-butanol and 2ethylhexanol are particularly suitable acrylic and methacrylic esters of this type. Mixtures of different esters of methacrylic acid or acrylic acid are also suitable. The content of styrene and/or acrylic or methacrylic esters of the said type in the copolymer is preferably from 20 to 60 percent by weight with reference to the copolymer. Copolymers which are soluble in water are obtained when at least 2 percent by weight of polymerizable hydrophilic monomers, for example salts of polymerizable acids such as ammonium acrylate or sodium acrylate, or hydroxyalkyl acrylates or ammonium compounds such as the hydrochloride of dimethylaminoethyl acrylate or methacrylate, are additionally used. The copolymers may also contain in addition up to 30 percent of their weight of other ethylenically unsaturated monomers in polymerized form. Examples of such monomers are vinyl esters such as vinyl acetate, vinyl propionate and the vinyl esters of carboxylic acids having a very high degree of chain branching, for example of carboxylic acids prepared by reaction of olefins with carbon monoxide and water with presence of sulfuric acid, N-methylolacrylamide and N-methylolmethacrylamide and their ethers with alkanols containing one to eight carbon atoms, for example the n-butyl ether of N-methylolmethacrylamide, and polymerizable acids, such as acrylic acid and methacrylic acid and their salts, amides and β-hydroxyalkyl esters such as β-hydroxyethyl acrylate, acrylonitrile, methacrylonitrile and also vinyl halides, such as vinyl chloride and vinylidene chloride.

The polymers having acetylacetate groups may be prepared by polymerization of the monomers by conventional methods using conventional polymerization catalysts. The polymerization is preferably carried out using free-radical-forming catalysts in solution or in emulsion. Conventional emulsifiers and/or protective colloids may be used when the copolymers are prepared in aqueous emulsion. The solvents mentioned above may be used as well as water when the polymers are prepared in solution. A preferred method of preparation is precipitation polymerization.

In some cases it may be advantageous to use (instead of polymerizable acetoacetic esters) appropriate monoesters of acrylic or methacrylic acid with the above-mentioned alkanediols in the production of the polymers having acetylacetate groups and to react with diketene the resultant copolymers which have free hydroxyl groups in side chains. Such reactions may be carried out for example according to the description given in German Pat. Spec. No. 940,680.

The amount of copolymer having acetylacetate groups and of the acetoacetate of a polyvalent metal in the coating or bonding agent may be varied within wide limits. Good results are achieved when for each two acetylacetate groups of the copolymer in the mixture, one atom of a divalent metal is present in the form of its acetylacetonate. When acetylacetonates of trivalent metals are used, particularly good results are obtained by providing three acetylacetate groups of the copolymer for each metal atom. In general 1 to 3, or 2 to 4, or 3 to 5 acetylacetate groups of the copolymer should be provided for 1 atom of the metal used as acetoacetate in the coating or bonding agent, depending on whether the metal used is divalent, trivalent or tetravalent.

Solutions or dispersions of copolymers having acetylacetate groups are mixed preferably with solutions of the metal acetoacetates in the preparation of the coating or bonding agents. The amount of solvent or diluent may be varied within limits. The mixtures generally contain 20 to 70 percent by weight of polymers having acetylacetate groups, with reference to the mixture of these polymers, the acetoacetates of heavy metals and the solvents or diluents. The mixtures may also contain conventional additives such as plasticizers, pigments, flow improvers, other binders such as phenoplast resins, aminoplast resins, phthalate resins, oil-modified phthalate resins, alkyd resins, epoxy resins, acrylate resins, cellulose derivatives and/or colophony or derivatives of the same.

The coating or bonding agents may be applied to the substrate, for example to a metal, in the conventional ways. They may be allowed to dry out at room temperature or they may be baked at elevated temperature, for example at temperatures up to 200° C. Clear films are thus obtained which are hard and weather resistant and also resistant to most chemical reagents. The films are insoluble in chelate-forming solvents such as acetylacetone and ethyl acetoacetate. Autoxidative cross-linking of the polymer may take place in the coating and bonding agents according to this invention under the action of atmospheric oxygen or other agents supplying oxygen. This autoxidation can be accelerated by adding a small amount of a heavy metal compound, for example a compound of iron, cobalt, lead or manganese such as cobalt naphthenate, cobalt octoate, cobalt acetate, cobalt acetate bromide, iron naphthenate and/or cobalt-lead-manganese octoate. They generally considerably improve the resistance of the coatings and impregnations to chemical reagents and their mechanical properties.

The new coating and bonding agents may be used to prepare coatings by spraying, brushing or dipping methods and may be applied to metal, wood, glass, porcelain and plastics. They are moreover suitable for bonding textiles and nonwovens and also as bonding agents in the production of laminates and laminated articles. Bonding in this specification is intended to include use of the bonding agents for the production of bonded nonwovens.

The invention is illustrated by the following Examples. The parts and percentages specified in the following examples are by weight.

EXAMPLE 1

13 parts of a 50 percent solution of a copolymer of 50 parts of butanediol-1,4 acrylate acetylacetate, 45 parts of methyl methacrylate and 5 parts of acrylic acid in butyl glycol has added to it 2 parts of concentrated aqueous ammonia solution, 30 parts of water and 10 parts of a 10 percent solution of aluminum triacetylacetonate in acetone and the whole is stirred until a homogeneous solution has been formed.

A film of the solution is allowed to dry out on a sheet of glass at 20° C. After the solvent has evaporated, a clear hard coating has formed which is insoluble in 10 percent aqueous caustic soda solution and in concentrated aqueous ammonia solution. After having been kept for a few days, the coating is insoluble in boiling ethyl acetate.

EXAMPLE 2

3 parts of aluminum triacetylacetonate is dissolved cold in 50 parts of a 60 percent solution of a copolymer of parts of butanediol-1,4 acetylacetate, 45.5parts of methyl methacrylate and 4.5parts of acrylic acid in butyl diglycol (viscosity measured in a DIN beaker having a 6 mm. nozzle = 180 seconds). Then 2 parts of a 20 percent solution of cobalt naphthenate in ethyl glycol, 10 parts of concentrated aqueous ammonia solution, 45 parts of water and 5 parts of turpentine are stirred in consecutively.

The coating agent obtained dries on wood, expanded polystyrene, asbestos cement, metal, glass and the like to give clear adherent scuff resistant, highly elastic films which are resistant to chemical reagents.

We claim:
1. A coating or bonding agent comprising
   A. a copolymer consisting essentially of
      a. 10 to 95 percent of its weight of a polymerized acetoacetic ester having the general formula:

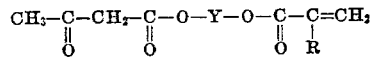

in which Y denotes a hydrocarbon radical having two to ten carbon atoms and R denotes a hydrogen atom or the methyl group;
      b. 5 to 90 percent of its weight of polymerized units of an acrylic ester or methacrylic ester of an alkanol having one to eight carbon atoms, styrene, and mixtures thereof; and
      c. 0 to 30 percent of its weight of polymerized units of one or more other ethylenically unsaturated monomers selected from the group consisting of a vinyl ester of a monocarboxylic acid, acrylamide, methacrylamide, N-methylolacrylamide, N-methylolmethacrylamide, ethers of N-methylolacrylamide with alkanols containing one to eight carbon atoms, ethers of N-methylolmethacrylamide with alkanols containing one to eight carbon atoms, β-hydroxyalkylacrylate, β-hydroxyalkylimethacrylate, acrylic acid, methacrylic acid, ammonium acrylate, ammonium methacrylate, sodium acrylate, sodium methacrylate, methacrylonitrile, vinylchloride and vinylidene chloride;
   B. an acetoacetate of a polyvalent metal selected from the group consisting of aluminum, zinc, nickel, beryllium, magnesium, zirconium, titanium, cobalt and copper; and
   C. an inert diluent.
2. A coating or bonding agent as claimed in claim 1 wherein the amount of component (a) is 25 to 70 percent.
3. A coating or bonding agent as claimed in claim 1 wherein the amount of component (b) is 20 to 60 percent.
4. A coating or bonding agent as claimed in claim 1 which contains in the copolymer at least 2 percent by weight of polymerized units of a polymerizable hydrophilic monomer selected from the group consisting of ammonium acrylate and ammonium methacrylate.